United States Patent Office 3,784,477
Patented Jan. 8, 1974

3,784,477
PAINT REMOVAL COMPOSITIONS
Raymond G. Esposito, R.F.D. 2, Union, Maine 04862
No Drawing. Continuation-in-part of application Ser. No. 5,944, Jan. 26, 1970, which is a continuation-in-part of application Ser. No. 670,428, Sept. 25, 1967, both now abandoned. This application Aug. 13, 1971, Ser. No. 171,760
Int. Cl. C09d 9/00
U.S. Cl. 252—162                                    11 Claims

ABSTRACT OF THE DISCLOSURE

Paint and other finishes can be readily and safely removed from even the most delicate pieces of furniture by using a mixture of (1) xylol or aromatic napthas with (b) at least 5 parts per hundred of either dimethylformamide, dimethylacetamide, or mixtures thereof. A preferred mixture is that of approximately 20% dimethylformamide with approximately 80% of xylol to form an azeotropic mixture. The object is immersed or sprayed in a tank with the mixture which is allowed to remain on the surface until it is softened. Then the swollen finish is removed by washing with fresh mixture and air-dried.

This is a continuation-in-part of my co-pending patent application 5,944 filed Jan. 26, 1970 (now abondoned) which in turn is a continuation-in-part of then co-pending patent application 670,428 filed Sept. 25, 1967 and now abandoned.

BACKGROUND OF INVENTION

Removal of paint, varnishes, and similar finishes from wood and metal objects can be accomplished by the use of various types of chemicals. Thus, aqueous sodium hydroxide is an efficient paint remover. However, it has a harmful effect on certain woods and metals and raises the grain of wood and softens glued joints. Where solvents such as benzene, methylethylketone, or methanol have been used as paint removers, they have the disadvantage of high volatility, low flash point, and high toxicity. Dichloromethane, which is a major constituent of many paint removers, is extremely costly and has a high volatility.

One object of this invention is to provide a safe, inexpensive, and efficient process and composition for the removal of paint, varnish, and other finishes from wooden and metal objects, including furniture and boats.

Another object of this invention is to provide such a composition which will not require neutralization or washing with any additional solvent to remove non-volatile components of the primary solvent.

A further object of this invention is to provide such a process and composition which will not require scraping.

Still another object of this invention is to provide such a process and composition which can be safely used with valuable wooden objects such as antique furniture and not damage the grain or glue joints.

SUMMARY OF INVENTION

The substance of the invention revolves around the discovery that xylol or aromatic naphthas can be used as an extender for dimethylformamide or dimethylacetamide with little change in paint removal activity. This discovery was surprising and unobvious particularly since dichloromethane which is a common component of solvent type paint remover, while extendable with methyl alcohol loses its paint-removal activity if extended with xylol.

It should be noted that although many organic solvents are miscible with one another, the mixtures can vary widely in paint removal activity. Also, the ability to remove paint cannot be determined from the ability to dissolve resins. Surface characteristics and the process of aging introduce complications. Accordingly, although dimethylformamide and dimethylacetamide when used alone have paint removal activity, it could not be predicted that they could be extended with a major amount of xylol or aromatic naphthas with insignificant loss of activity.

The process of this invention comprises broadly covering the object to be stripped by immersion or spraying with a liquid mixture comprising (a) about at least 15% by weight of dimethylformamide, dimethylacetamide or mixtures thereof with the balance being (b) a miscible organic solvent consisting essentially of xylol, aromatic naphthas or mixtures thereof. It is generally uneconomic to use more than 50% of amide, since use of up to 85% of much cheaper ingredients (xylol or aromatic naphthas) yields a composition of similar paint removal activity as composition having high amide contents.

This organic solvent (b) can be diluted or extended freely with methyl alcohol and up to about 20% of its weight with miscible organic liquids excluding alcohols containing 4 or more carbon atoms or more than one hydroxyl group. Such organic liquids include ethyl alcohol, propyl alcohol, cyclohexanone, methyl ethyl ketone, ethyl acetate, acetone and diacetyl acetone; excluded are butanol, ethyleneglycol and cyclohexyl alcohol. It should be noted that such dilution of the solvent does reduce paint removal activity except in the case of methyl alcohol.

The addition of about 0.25 to 3% of ammonium hydroxide or miscible acids and amines can increase the speed of the process and reduce the minimum amount of amides to 5 parts. Such acids and amines include formic, lactic, acetic, mono-, di- and trichloroacetic and hydrochloric acids and ethyl, propyl and butyl amines and exclude amines having hydroxyl groups.

The object is allowed to remain in contact with the liquid for a sufficient time to have the surface swollen. With varnished or lightly painted objects this may be a matter of a few minutes, whereas with objects which have very many layers of paint, this may require several hours. After there has been sufficient softening, the object is washed or brushed with fresh liquid mixture to remove the swollen paint and then dried, preferably with a current of warm air. Generally, no scraping is required.

The process is preferably conducted in three vessels or tanks. The first tank is the immersion or spray tank containing a rack in which the object is placed and covered with the liquid mixture. The rack is supported above the bottom of the tank to allow solid particles removed from the stripped article to settle down and away from it. After the finish has been softened with the liquid mixture, the object may be placed in a separate rinse tank where any remaining finish is removed by brushing and/or spraying with the liquid mixture. A third tank is the drying tank in which the rinsed object is placed. A current of warm air, as for example 40° C., dries the object and is itself passed through a condensing system to recover evaporated solvents. This recovered solvent is preferably combined with solvent saturated with dissolved components of the paint and varnish from the immersion and rinse tanks and purified by distillation for reuse. The object when removed from the drying tank is completely stripped of previous finishes and requires no other steps such as scraping.

Xylol is preferred as the miscible organic solvent in this invention, in particular because it forms an azeoptropic mixture with dimethylformamide which permits ease in handling and in solvent recovery. Xylol is desirable also because it has relatively low toxicity, flammability and volatility and is relatively inexpensive. However, xylol alone is completely ineffective as a paint removal medium. Further, xylol mixed with up to 50% of dichloromethane (methylene chloride) has substantially no paint removal activity although dichloromethane itself is an effective paint remover.

It was thus unobvious and unexpected that xylol or aromatic naphtha can have high paint removal activity when used in high proportions with dimethylformamide, dimethylacetamide or mixtures thereof.

SPECIFIC EXAMPLES OF INVENTION

EXAMPLE 1

A mixture of approximately 80% by weight of xylol and 20% dimethylformamide was placed in a tank. Wood samples having six layers of old, hardened paint were immersed in the mixture for varying times and at various temperatures and tested for extent of paint removal. At about 40° C. there was complete paint removal in about ten minutes. At about 25° C. half the paint was removed in ten minutes. However, within an hour, all the paint was removed where the immersion bath was at 25° C.

The softened finish was removed by either brushing or spraying the object with a jet of the original liquid mixture, draining and then placing in a chamber through which there passed a stream of air at about 40° C. The air was exhausted through a condensing system consisting of cooling coils to remove the evaporated solvent from the effluent air stream. The solvents from the immersion and rinse tanks containing dissolved components of paint were combined with solvent condensed from the effluent air stream of the drying tank and purified and recovered for reuse by distillation and condensation.

EXAMPLE 2

The process of Example 1 was repeated except that the liquid mixture used comprised 20% by weight of dimethylformamide, 70% xylol and 10% ethyl alcohol. The results were similar to Example 1 except that about 10% more immersion time was needed. A similar increase in required immersion time was noted where 10% methyl ethyl ketone or 10% cyclohexanone or 10% isopropanol were substituted for the 10% ethyl alcohol. However, where 10% N-butanol was substituted for the 10% ethyl alcohol, a 50% increase in immersion time was needed as compared with Example 1.

EXAMPLE 3

The process of Example 1 was repeated except that the liquid comprised solely dimethylformamide. The results were substantially the same as in Examples 1 and 2.

EXAMPLE 4

The process of Example 1 was repeated except that the liquid mixture comprised 10% dimethylformamide and 90% xylol. The results obtained were decidedly inferior to any of the preceding examples. Even after an immersion for an hour and fifteen minutes, only half of the paint was removed.

EXAMPLE 5

The process of Example 1 was repeated except that the liquid mixture used comprised 20% by weight of dimethylformamide and 80% by weight of aromatic napthas having a distillation range of from about 250° to 400° F. The results were substantially similar to those of Example 1.

EXAMPLE 6

The process of Example 1 was repeated except that 20% dimethyl acetamide was substituted for the 20% dimethylformamide. The results were substantially similar to those of Example 1.

EXAMPLE 7

The process of Example 1 was repeated except that n-butanol, cyclohexanol and ethylene glycol were in separate cases substituted for the xylol. In all instances, the results were unsatisfactory with incompete stripping even after many hours of immersion.

EXAMPLE 8

The process of Example 1 was repeated except that 1% of formic acid, ethylamine, lactic acid, hydrochloric acid and propyl amine were in separate cases added to the liquid mixture. The effect was in all instances to cut required immersion time in half.

EXAMPLE 9

The process of Example 1 was repeated except that the liquid mixture comprised 20% by weight of dimethylformamide and (a) 70% xylol, 10% methyl alcohol
(b) 60% xylol, 20% methyl alcohol
(c) 40% xylol, 40% methyl alcohol.

In all cases, the results were similar to Example 1 with about the same required immersion times.

I claim:
1. A paint removing composition consisting essentially of
   (a) about 15 to 50% by weight of either dimethylformamide, dimethylacetamide or mixtures thereof and
   (b) about 50 to 85% of either xylol, aromatic naphthas or mixtures thereof.
2. A paint removing composition consisting essentially of
   (a) about 5 to 50% by weight of either dimethylformamide, dimethylacetamide or mixtures thereof;
   (b) about 50 to 95% of either xylol, aromatic naphthas or mixtures thereof; and
   (c) about 0.25 to 3% of either ammonium hydroxide, ethyl amine, propyl amine, butyl amine or mixtures thereof, or formic acid, acetic acid, lactic acid, mono-, di- or trichloroacetic acid, hydrochloric acid or mixtures thereof.
3. The paint removing composition of claim 1 wherein (b) has been diluted 10% to about 40% by weight with methyl alcohol or diluted up to about 20% with ethyl alcohol, propyl alcohol, acetone, methyl ethyl ketone, ethyl acetate, diacetyl acetone, cyclohexanone or mixtures thereof.
4. The paint removing composition of claim 2 wherein (b) has been diluted 10% to about 40% by weight with methyl alcohol or diluted up to about 20% with ethyl alcohol, propyl alcohol, acetone, methyl ethyl ketone, ethyl acetate, diacetyl acetone, cyclohexanone or mixtures thereof.
5. The composition of claim 1 wherein (a) is dimethylformamide.
6. The composition of claim 1 wherein (b) is xylol.
7. The composition of claim 2 wherein (a) is dimethylformamide.
8. The composition of claim 2 wherein (b) is xylol.
9. The paint removing composition of claim 1 wherein (a) is dimethylformamide and (b) is xylol.
10. The paint removing composition of claim 2 wherein (a) is dimethylformamide and (b) is xylol.

11. A paint removing composition consisting essentially of about 20% by weight of dimethylformamide and about 80% of xylol.

References Cited

UNITED STATES PATENTS

| | | | |
|---|---|---|---|
| 3,179,609 | 4/1965 | Morison | 252—Dig. 8 |
| 1,584,231 | 5/1926 | Koory | 252—Dig. 8 |
| 2,433,517 | 12/1947 | Kuentzel | 252—Dig. 8 |
| 2,495,728 | 1/1950 | Hutson | 252—Dig. 8 |

OTHER REFERENCES

Rose: The Cond. Chem. Dictionary, 6th ed., Reinhold Publ. Co., p. 392.

WILLIAM E. SCHULZ, Primary Examiner

U.S. Cl. X.R.

134—38; 252—171, Dig. 8